United States Patent [19]

Adams et al.

[11] 4,375,441
[45] Mar. 1, 1983

[54] METHOD FOR PRODUCING SINTERED POROUS POLYMERIC ARTICLES

[75] Inventors: Richard C. Adams, Chardon; Albert J. Herold, Bedford, both of Ohio

[73] Assignee: The Standard Oil Company, Cleveland, Ohio

[21] Appl. No.: 217,886

[22] Filed: Dec. 18, 1980

[51] Int. Cl.³ .............................................. H05B 1/00
[52] U.S. Cl. ...................................... 264/25; 264/26; 264/126; 264/141; 264/143
[58] Field of Search ................ 264/25, 26, 126, 141, 264/143

[56] References Cited

U.S. PATENT DOCUMENTS

| | | | |
|---|---|---|---|
| 1,742,515 | 1/1930 | Mandell | 264/43 |
| 1,873,223 | 8/1932 | Sherwood | 75/212 |
| 1,934,383 | 11/1933 | Stafford | 501/85 |
| 2,085,047 | 6/1937 | Schneider | 106/122 |
| 2,252,277 | 8/1941 | Tate et al. | 252/503 |
| 2,356,076 | 8/1944 | Moberly | 252/506 |
| 2,400,091 | 5/1946 | Alfthan | 264/115 |
| 2,413,498 | 12/1946 | Hill | 264/127 |
| 2,456,262 | 12/1948 | Fields | 264/120 |
| 2,710,991 | 6/1955 | Parkhurst | 264/113 |
| 2,862,278 | 12/1958 | Engel et al. | 264/141 |
| 2,985,918 | 5/1961 | Moore et al. | 264/53 |
| 3,058,166 | 10/1962 | Fields | 264/54 |
| 3,426,102 | 2/1969 | Selak et al. | 525/310 |
| 3,519,517 | 7/1970 | Dench | 264/26 |
| 3,586,737 | 6/1971 | Duke et al. | 525/310 |
| 3,646,188 | 2/1972 | Campbell | 264/25 |
| 4,000,106 | 12/1976 | Isley | 260/31.8 DR |
| 4,041,005 | 8/1977 | Talsma et al. | 260/32.8 A |
| 4,151,151 | 4/1979 | Isley | 252/434 |
| 4,216,179 | 8/1980 | Lamberts et al. | 264/25 |
| 4,268,465 | 5/1981 | Suh et al. | 264/25 |

Primary Examiner—James R. Hall
Attorney, Agent, or Firm—William D. Mooney; Herbert D. Knudsen; Larry W. Evans

[57] ABSTRACT

A process for forming sintered porous polymeric articles by the steps of sintering preforms of polymeric particles with dielectric heat, or with dielectric heat in combination with conventional heating techniques. Sintered porous polymeric articles made of rubber-modified nitrile resins in accordance with the foregoing processes are also disclosed.

38 Claims, 3 Drawing Figures

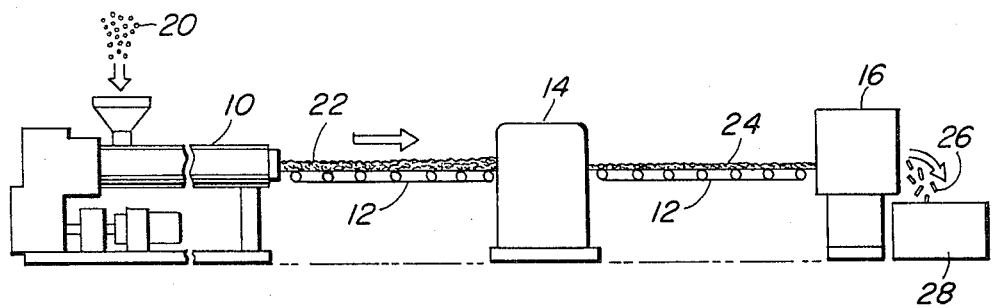
_FIG. 1_
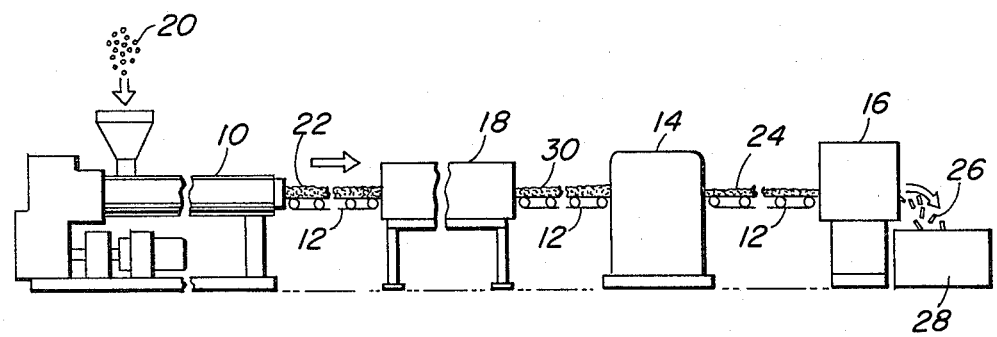
_FIG. 2_
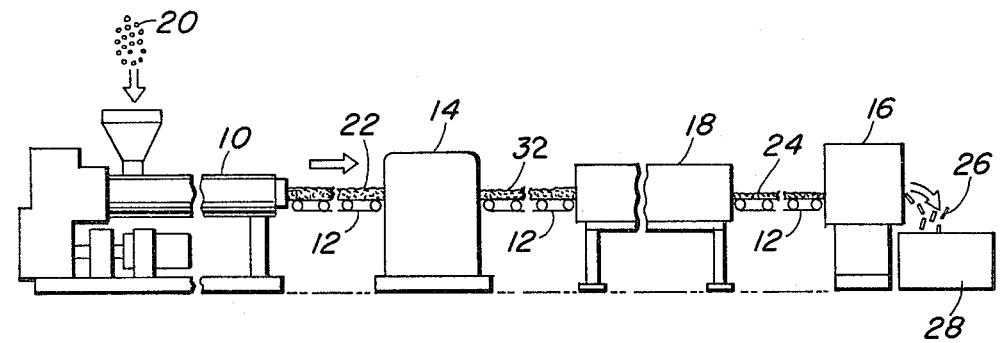
_FIG. 3_

METHOD FOR PRODUCING SINTERED POROUS POLYMERIC ARTICLES

TECHNICAL FIELD

This invention relates to a method of forming sintered porous polymeric articles, and the articles produced therefrom. More particularly, this invention relates to a method of sintering a preform of discrete polymeric particles using dielectric heat alone or in combination with conventional heat.

BACKGROUND OF THE INVENTION

Sintering is the welding together of small particles by heating such particles without melting them at temperatures below the temperature at which they flow completely; the particles are fused together to form a relatively strong mass, but the mass as a whole does not melt. Sintering is used in powder metallurgy but has application with ceramics, cellulose derivatives and polytetrafluoroethylene resin compositions. The prior art methods for producing sintered articles generally comprises the steps of introducing finely divided powder into a mold, compressing the powder to a preform of a desired shape, heating the preform at a sintering temperature, and then cooling the sintered article. When sintered articles with porous structures are desired, volatile materials are generally mixed with the preform; upon sintering the volatile material evaporates or escapes leaving voids in the sintered product.

Examples of these methods are disclosed in U.S. Pat. Nos. 1,873,223 (sintering a mixture of metal particles and a volatile lubricant to form porous bearings or similar articles), 1,742,515 and 1,934,383 (sintering ceramic particles in the presence of a volatile component to form porous bricks), 2,085,047 (forming a porous article by heating a mixture of a derivative of cellulose and a salt or other compound that is insoluble in the mixture at a temperature high enough to decompose the salt or other compound but not high enough to melt the cellulose derivative), 2,252,277 (heating a mixture of "Bakelite" and a pore forming substance at a high enough temperature to evacuate the latter leaving a porous structure), and 2,356,076 (forming a porous carbon plate by heating a mixture of green carbon fluor and particles of a volatile substance at a temperature that causes the latter to change to a gas and escape leaving cavities conforming to the original particles).

U.S. Nos. 2,400,091; 2,413,498; 2,456,262; 2,710,991; and 2,985,918 disclose various techniques for shaping sintered articles of polytetrafluoroethylene. U.S. Pat. No. 2,400,091 discloses a process for producing a porous article by the steps of heating polytetrafluoroethylene at a temperature in the range of 327° C. to 500° C., cooling the polymer to a temperature below 327° C., subdividing the cooled polymer to a particle size less than about 20 mesh, forming the finely divided polymer in the shape of the desired article by pressing it in a mold at a temperature below 327° C., heating the shaped polymer at a temperature between 327° C. and 500° C. until it is heated throughout to said temperature, and cooling the resulting article. U.S. Pat. No. 2,413,498 discloses a molding process that includes the steps of mixing polytetrafluoroethylene and a heat-decomposable film-forming material and then removing the film-forming material at a temperature sufficiently high to flash off the film-forming material, and continuing heating until the polytetrafluoroethylene coalesces in the form of desired shaped articles such as rods, tubes, and unsupported forms. U.S. Pat. No. 2,456,262 discloses a process of fabricating polytetrafluoroethylene articles by the steps of subjecting finely divided polytetrafluoroethylene to a pressure in a die to form a shaped body, releasing the pressure and removing the shaped body from the die, heating the shaped body at a temperature above 327° C. until it is sintered, and cooling the shaped body to a temperature below 250° C. under pressure in a die having the shape of the desired finished article. U.S. Pat. No. 2,710,991 discloses a method of producing thin sheet-like articles from polytetrafluoroethylene which includes the steps of molding preforms at substantially room temperature, releasing the molding pressure, heating the preforms to a sintering temperature and then cooling the sintered article. The preforms are molded from the polymer in dry powdered form by spreading a plurality of charges of the dry powder one above the other in the mold, the charges being separated by flexible separator sheets, and consolidating the charges by the application of pressure. U.S. Pat. No. 2,985,918 discloses a process for forming shaped lengths of polytetrafluoroethylene having a cellular structure that includes the steps of extruding through a die a paste composition of finely divided polytetrafluoroethylene and finely divided methyl methacrylate polymer intimately mixed with a volatile organic lubricant and thereafter heating the resultant shaped article to sinter the polytetrafluoroethylene and to decompose and volatilize the acrylic polymer to form minute interconnecting pores throughout the article.

The prior art methods teach the use of conventional heating techniques. The term "conventional heating", and cognate terms such as "conventional heat", are used herein to mean heating by conduction or convection or a combination thereof using a conventional heating source, such as an open flame or a heating coil, with the heat being transferred to the article being heated by a solid, liquid or gaseous (e.g., air) medium. Conventional heating is not used herein to include "dielectric heating" which is defined hereafter.

Effective sintering of polymeric preforms to attain desirable levels of strength and porosity for the sintered articles produced therefrom requires sufficient fusing of the individual polymeric particles both at the surface and in the interior of the article without such particles completely melting. Porous polymeric preforms exhibit relatively poor heat transfer characteristics (partially due to their porous structure) and, consequently, effective sintering of such materials can be attained with conventional heating only at the cost of lengthy and carefully monitored heating cycles. Insufficient heating results in sintered articles with poor fusion in their interiors and, consequently, inadequate strength. Overheating results in sintered articles with overfusion on their exterior surfaces and, consequently, inadequate porosity. The proposal of admixing volatile components to compensate for the lengthy carefully monitored heating cycles results in additional preform preparation procedures and, in some instances, procedures for removing excess volatiles subsequent to sintering. Additionally, careful monitoring and control of the heating cycle is still required to avoid cracking or splitting due to excessively rapid or uncontrolled evaporation of the volatile component.

SUMMARY OF THE INVENTION

It has now been discovered that sintered porous polymeric articles with good strength and porosity characteristics can be formed with relatively short and easy to control heating cycles and without the necessity of admixing volatile components by a method comprising heating preforms of the articles with dielectric heat. The term "dielectric heat", and cognate terms such as "dielectric heating", are used herein to mean heating by the penetration of electromagnetic radiation in the range of about 1 to about 10,000 MHz. Dielectric heating encompasses both high-frequency heating and microwave heating. High-frequency heating, which is sometimes referred to as radio-frequency heating, utilizes frequencies in the range of about 1 to about 200 MHz. Microwave heating utilizes frequencies above about 890 MHz, and preferably in the range of about 890 MHz to about 10,000 MHz. Broadly stated, the invention contemplates a method for producing a sintered porous polymeric article comprising heating a preform of polymeric particles with dielectric heat. In a preferred embodiment, the invention contemplates sintering a preform of polymeric particles with a combination of dielectric heat and conventional heat.

Further, the invention contemplates a continuous process and the apparatus therefor for forming sintered porous polymeric articles comprising forming a preform of polymeric particles and sintering the preform with dielectric heat alone or with a combination of dielectric heat and conventional heat. In a preferred embodiment, the invention contemplates forming a continuous length of packed polymeric particles comprising the preform. In a particularly advantageous embodiment, the preform is formed by extruding the polymeric particles.

Further, the invention contemplates a compressed mass of polymeric particles suitable for sintering with dielectric heat. In a preferred embodiment the invention contemplates a preform comprising a mixture of coarse polymeric particles and fines. In still another preferred embodiment the invention contemplates a preform comprising a compressed mass of polymeric particles and an effective amount of water to enhance the strength of the sintered article formed therefrom.

The product of this process comprises a porous sintered polymeric article. In a particularly advantageous and, therefore, greatly preferred embodiment, the product of the present invention comprises a rubber-modified nitrile resin. Sintered articles made in accordance with the present invention from such rubber-modified nitrile resins are advantageously chemically resistant and hydrophillic in character.

BRIEF DESCRIPTION OF THE DRAWINGS

FIG. 1 is a partially fragmented elevational view of apparatus used in accordance with the present invention for forming sintered porous polymeric articles by the steps of extruding a preform of a continuous length of packed polymeric particles and sintering the preform in a dielectric heat oven;

FIG. 2 is a partially fragmented elevational view of apparatus used in accordance with the present invention for forming sintered porous polymeric articles by the steps of extruding a preform of a continuous length of packed polymeric particles, heating the preform with conventional heating techniques, and, subsequently, sintering the preform with dielectric heat; and FIG. 3 is a partially fragmented elevational view of apparatus used in accordance with the present invention for forming porous polymeric articles by the steps of extruding a preform comprising a continuous length of packed polymeric particles, followed by the steps of heating the preform with dielectric heat and then completing the sintering process with conventional heating techniques.

DESCRIPTION OF THE PREFERRED EMBODIMENT

Further features and advantages of the invention will be apparent from the detailed description of the preferred embodiment herein set forth.

The present invention will be described hereinafter as applied particularly to rubber-modified nitrile resins. It is to be understood, however, that the starting material of the process of the invention (i.e., the polymeric materials to be sintered) may be any polymeric material or polymeric composition with a sufficiently high "loss factor" (hereinafter defined) to be effectively heated with dielectric heat. In preferred embodiments the starting materials are selected from polymers or polymer compositions having loss factors above about 0.08, preferably above about 0.2.

The term "loss factor" is used herein to mean the product of the "power factor" and the "dielectric constant" of a material. In the case of a perfect, or lossless, dielectric, the displacement current leads the voltage by a temporal phase angle of 90°. For an imperfect dielectric the phase angle is less than 90°. The cosine of the phase angle is the "power factor". Between any two electrically charged bodies there is a force (attraction or repulsion) which varies according to the strength of the charges, the distance between the bodies, and a characteristic of the medium separating the bodies (the dielectric) known as the "dielectric constant". This force, f, is found by the equation $$f = \frac{q_1 q_2}{\epsilon r^2}$$

in which $q_1$ and $q_2$ are the respective charges, $r$ is the distance, and $\epsilon$ is the dielectric constant. For a vacuum $\epsilon$ is 1.0000; for air, $\epsilon = 1.00059$. In practice the dielectric constant of a material is found by measuring the capacitance of a parallel plate condenser using the material as the dielectric, then measuring the capacitance of the same condenser with a vacuum as the dielectric, and expressing the result as a ratio between the two capacitances. Further discussions concerning dielectric heating, high frequency and microwave equipment selection and design, and a partial listing of loss factors for various polymers or polymeric compositions can be found in "Encyclopedia of Polymer Science and Technology", Interscience Publishers, a division of John Wiley & Sons, Inc., Volume 5, pages 1 to 23, which is incorporated herein by reference.

The rubber-modified nitrile resins embodied herein are those which result from the polymerization of a major portion of an olefinically unsaturated nitrile, optionally another monomer component, and in the presence of a preformed rubber component by methods known to those skilled in the art.

The polymers which are most useful in the process of this invention include those produced by polymerizing a major proportion of a monounsaturated nitrile, such as acrylonitrile, and optionally a minor proportion of another monovinyl monomer component copolymerizable with said nitrile in an aqueous medium in the presence of a preformed diene rubber which may be a homopolymer or a copolymer of a conjugated diene monomer.

The esters of olefinically unsaturated carboxylic acids include those having the structure

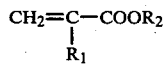

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene-1,3 and isoprene because of their ready availability and their excellent copolymerization properties.

The olefinically unsaturated nitriles useful in the present invention are the alpha, beta-olefinically unsaturated mononitriles having the structure

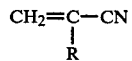

wherein R is hydrogen, a lower alkyl group having from 1 to 4 carbon atoms, or a halogen. Such compounds include acrylonitrile, alpha-chloroacrylonitrile, alpha-fluoro-acrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which is useful in this invention includes one or more of the esters of olefinically unsaturated carboxylic acids.

Polymerizates of particular utility in this invention and details of their method of preparation are described in U.S. Pat. Nos. 3,426,102; 3,586,737; 4,000,106; 4,041,005; and 4,151,151, these references being incorporated herein by reference.

Specific polymerizates useful in the process of this invention include those prepared by the polymerization of 100 parts by weight of (A) at least 50% by weight of at least one nitrile having the structure

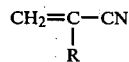

wherein R has the foregoing designation and (B) up to 50% by weight based on the combined weights of (A) and (B) of an ester having the structure

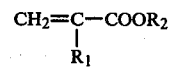

wherein $R_1$ and $R_2$ have the foregoing respective designations, in the presence of from 1 to 40 parts by weight of (C) a rubbery polymer of a conjugated diene monomer selected from the group consisting of butadiene and isoprene and optionally a comonomer selected from the group consisting of styrene, a nitrile monomer having the structure

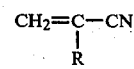

wherein R has the foregoing designation, and a monomer having the structure

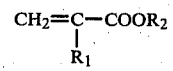

wherein $R_1$ and $R_2$ have the foregoing respective designations, said rubbery polymer containing from about 50 to 100% by weight of polymerized conjugated diene and from about 0 to 50% by weight of comonomer.

Preferably, component (A) should be present in from about 60 to 90% by weight based on the combined weights of (A) and (B) and the rubbery polymer (C) should contain more than 50% by weight of conjugated diene and more preferably from 60 to 90% by weight of the conjugated diene. Materials within this class are commercially available from the Standard Oil Company (Ohio), Cleveland, Ohio, under the trade name "Barex".

The polymerizates useful in the process of this invention can contain compounding ingredients and additives, pigments, colorants, stabilizers, etc., as is well known in the art, so long as the balance between impact strength, flexural strength, tensile strength, processability, heat-distortion temperature, and the like, is not affected to such a degree that the article is no longer useful for its intended purpose.

Subdivision of the starting material into discrete polymeric particles can be accomplished by a variety of mechanical methods such as with a hammer mill, a stamping mill, an attrition mill, a rotary cutter or a Wiley mill. Such methods are entirely conventional in procedure and equipment, structure and operation, and, being well known to those skilled in the art, need not further be described. The starting material is reduced until substantially all of it passes through a No. 16 Tyler mesh sieve and, preferably, a No. 70 Tyler mesh sieve.

As a particular feature of the invention preforms of compressed shaped masses of the subdivided starting material are formed prior to sintering. The subdivided starting material is shaped to the form of the desired sintered article by, for example, compacting the subdivided particles of starting material in a mold at a temperature below the melting point of the material, preferably at room temperature. In preferred embodiments of the invention subdivided particles of rubber-modified nitrile resin compositions are compacted at temperatures below about 120° C., preferably at room temperature. Pressures of from about 100 to about 4000 pounds per square inch (PSI) are preferably employed in shaping the preforms in the mold. In some instances, however, particularly when temperatures above room temperature are employed, the preforms are formed with no applied pressure or with pressures below about 100 PSI. Alternatively, depending on the shape, size and porosity of the desired preform and the sintered article to be made therefrom, higher pressures, up to 10,000 PSI or more, are used.

The preform can be sintered in the mold or removed from the mold prior to sintering. If the preform is sintered in the mold, sintering can be conducted with pressures as above described applied to the preform, the amount of pressure, if any, being dependent upon the desired strength and porosity of the article to be sintered. If the preform is sintered in the mold, non-metallic molds (e.g., ceramic, plastic, etc.) must be used to avoid deleterious effects of dielectric heating.

In a particularly advantageous embodiment of the invention an effective amount of particle fines of starting material are mixed with the subdivided starting material prior to forming the preform to enhance the strength of the sintered article produced therefrom. The fines are formed during the subdivision process discussed above and comprise particles of starting material small enough to pass through a No. 240 Tyler mesh sieve. The fines are mixed with the subdivided starting materials at a ratio of up to about 100%, preferably about 5% to about 25%, by weight based on the combined weight of particles in the preform. Accordingly, in this embodiment, the preform comprises from about 0% to about 100%, preferably about 75% to about 95%, by weight based on the total weight of the preform of coarse particles of starting material. The term "coarse particles" as used in the specification and claims means particles small enough to pass through a No. 16 Tyler mesh sieve, preferably a No. 70 Tyler mesh sieve, but large enough to be retained on a No. 240 Tyler mesh sieve.

In a preferred aspect of the invention an effective amount of water is mixed with the starting material prior to forming the preform to enhance the strength of the sintered product produced therefrom. The water is mixed with the starting material at a ratio of up to about 25%, preferably between about 1% and about 10%, by weight based on the combined weight of the polymeric particles and the water of the preform. In a particularly advantageous embodiment the preform comprises about 5% by weight of water.

While not wishing to be bound by theory, it is believed that the addition of fines to the preform enhances the strength of the sintered article produced therefrom because the fines fit more readily into voids between the coarse particles and provide an increased number of fusion points. Under various conditions the fines may also completely melt and flow during the sintering process and thereby function as a binder for the coarse particles which do not completely melt. It is believed that the addition of water to the preform enhances the strength of the sintered article produced therefrom because the water functions as a plasticizer for the resin. Water is also known to be a high loss material for dielectric heating and, consequently, it is believed that the water enhances the transfer of heat to the starting material during dielectric heating and thereby enhances the sintering process.

In the practice of the method of the present invention preforms of the starting material are sintered with dielectric heat. The exposure to dielectric heat is continued for a sufficient period of time to form sintered articles with desirable strength and porosity characteristics; the optimum exposure being dependent on the intensity of the dielectric heat, the specific starting material employed, the size and shape of the preforms, and the specific strength and porosity characteristics desired for the articles to be sintered. Effective sintering with dielectric heat is advantageously accomplished, due to the practical limitations of production requirements and other processing steps, in about one second to about two minutes, preferably about 5 to about 40 seconds. Frequencies in the high-frequency range of about 30 MHz to about 100 MHz are preferred. The intensity or power level is controlled by adjusting the height of the gap between the electrodes of the dielectric oven and the preform; specific intensity levels in relation to the gap adjustments being dependent upon the particular dielectric equipment employed. All aspects and features of performance of this sintering step can be in conformity with standard industrial dielectric heating techniques except that the extent of exposure of the preform to the dielectric heat must be carefully controlled to provide an effective sintering of the starting material resulting in the formation of sintered articles with desirable strength and porosity characteristics. Over exposure may result in sintered articles with inadequate porosity. Under exposure may result in sintered articles with inadequate strength. An advantage of sintering with dielectric heat is that heating and fusion occurs throughout the entire volume of the article substantially simultaneously and, consequently, the poor heat transfer characteristics of the preforms of the starting materials used herein are relatively inconsequential. Additionally, dielectric heating can be turned on and off instantaneously and, consequently, the sintering process of the invention can be monitored and controlled easily and precisely with reasonably simple equipment. Further, dielectric heating is efficient and thus does not throw off excessive wasted heat, and selective portions of the preform can be sintered leaving the remaining portions cool. Finally, dielectric heating equipment is easy to operate, basically long-lived, and requires relatively little maintenance.

In a particularly advantageous embodiment of the method of the present invention conventional heating is used in combination with dielectric heating. The conventional heating step may precede or follow the dielectric heating step, the sequence of these heating steps not being critical. The combination of dielectric heating and conventional heating is particularly advantageous with large, complexly configured or non-homogeneous articles where there is, in some instances, a tendency for portions of the article, particularly in the interior, to overfuse during the dielectric heating step before effective sintering has occurred at or near the surface. Under such circumstances conventional heating is advantageously employed to either (1) precondition the exterior of the article by raising its temperature to approach sintering or achieve partial sintering and thereby permit subsequent facilitated sintering with the dielectric heating step, or (2) sinter the exterior subsequent to the preconditioning or partial sintering of the exterior with the dielectric heating. The conditions under which the conventional heating step is conducted are dependent upon the degree of heating required (i.e., whether sintering conditions or less intense conditions are to be employed) and the specific starting material used. In preferred embodiments of the invention, polymer compositions of rubber-modified nitrile resins are heated with conventional heating at a temperature in the range of about 120° C. to about 230° C., preferably about 160° C. to about 200° C., for about 2 to about 60 minutes, preferably about 15 to about 30 minutes. Oven temperatures of, for example, 260° C. that are higher than temperatures in these ranges can be employed provided residence times in the oven are limited to prevent the material being heated from exceeding these ranges.

The method of the present invention can be conducted on a batch or a continuous basis. In either case the operating parameters of each step of the process must be established within the foregoing limitations to accommodate the particular starting material employed and the particular size and configuration of the article to be sintered.

In a preferred embodiment of the present invention apparatus for a continuous process, depicted in FIG. 1, comprises extruder 10, conveyor 12, dielectric oven 14 and takeoff 16. Extruder 10 is preferably a ram or reciprocating ram extruder in which the material being extruded is advanced through the barrel and die by means of a ram or plunger rather than by a screw. In a reciprocating ram extruder two extruder units may be placed side-by-side, or end-to-end, and pulsating flow of the extrudate from alternating operated rams or plungers, aided by a valving system, is combined in a single smooth-flowing stream. Subdivided particles 20 of the starting material, which are prepared as discussed above and which advantageously include a mixture of water and/or fines, are added to the extruder 10 and extruded as a preform 22 comprising a continuous length of packed polymeric particles with a desired profile defined and determined by the extruder die. Extruder 10 is operated at a temperature below the melting point of the starting material, preferably room temperature. In instances wherein the starting material comprises rubber-modified nitrile resins, the extruder 10 is operated at a temperature below about 120° C. The preform 22 is conveyed along conveyor 12 to dielectric oven 14, the distance between extruder 10 and dielectric oven 14 not being critical. Dielectric oven 14 preferably includes a conveyor belt (not shown) communicating with conveyor 12 for carrying the preform through the dielectric oven 14. The conveyor belt must be made of a material that will not react with the starting material being sintered or be affected deleteriously by the electrode field or heat. The conveyor belt might be a low-loss material such as silicone rubber, or glass fiber, or it may be a good conductor such as stainless steel. Dielectric oven 14 is operated within the operating parameters and limitations discussed above. The production rate of extruder 10 and the speed of conveyor 12 are adjusted to permit a residence time of preform 22 in dielectric oven 14 of about one second to about two minutes, preferably about 5 to about 40 seconds.

The sintered product 24 is conveyed from dielectric oven 14 along conveyor 12 to takeoff equipment 16. The distance between the dielectric oven 14 and takeoff 16 is not critical but should be sufficient to permit adequate cooling of the sintered product 24 prior to processing in the takeoff 16. Takeoff 16 preferably includes belt units that may include cleats shaped to the profile of the sintered product 24 to prevent distortion, and travelling saws for relatively rigid products or a flyknife cutter for relatively flexible products. The individual sintered articles 26 exit the takeoff 16 and are collected in a box 28 or other suitable collection means.

Alternate preferred embodiments of the apparatus of the present invention depicted in FIG. 1 are disclosed in FIGS. 2 and 3. Devices and articles that are the same as disclosed in FIG. 1 are identified by the same numerals in FIGS. 2 and 3. The embodiment disclosed in FIG. 2 is the same as the embodiment of FIG. 1 with the exception that conventional heating oven 18 is between extruder 10 and dielectric oven 14 to provide conventional heating of the preform 22 to yield preconditioned or partially sintered product 30 which is thereafter conveyed to dielectric oven 14 wherein the sintering process is completed. The embodiment disclosed in FIG. 3 is the same as the embodiment of FIG. 1 with the exception that conventional heating oven 18 is between dielectric oven 14 and takeoff 16 to complete the sintering of the heated or partially sintered product 32 conveyed from the dielectric oven 14. In all other respects, the embodiments disclosed in FIGS. 2 and 3 are the same as the embodiment disclosed in FIG. 1.

Oven 18 may comprise, for example, a forced air oven. Oven 18 is sufficiently elongated to permit a residence time of the material being heated of about 2 to about 60 minutes, preferably about 15 to about 30 minutes. Oven 18 may include one or a plurality of heating zones. In preferred embodiments, the starting material 20 comprises rubber-modified nitrile resins and oven 18 is operated at a temperature in the range of about 120° C. to about 230° C., preferably about 160° C. to about 200° C.

The embodiments disclosed in both FIGS. 2 and 3 comprise apparatus for use in a sintering process employing both dielectric heating and conventional heating techniques and are advantageously employed with continuous preforms having large or complexly configured cross-sectional designs or profiles. In the embodiment disclosed in FIG. 2, the preform 22 is preconditioned in oven 18 by having its temperature raised to a point approaching sintering or to achieve partial sintering prior to conveyance to the dielectric oven 14 to complete the sintering process. In FIG. 3, the dielectric oven 14 functions to either precondition the preform 22 by heating it to a temperature approaching the sintering temperature or to partially sinter the preform, the sintering process subsequently being completed in oven 18.

The sintered articles or products produced by methods in accordance with the invention comprise porous structures with properties that are dependent upon the specific sintering conditions used and the particular starting material employed. In preferred embodiments of the invention, porous structures comprising rubber-modified nitrile resins are produced that have a specific gravity in the range of about 0.3 to about 1.2, preferably about 0.5 to about 1.0, and water absorption capacities of between about 10% and about 150% by weight, based on the weight of said article, preferably about 30% to about 100% by weight. Sintered articles made in accordance with the present invention from such rubber-modified nitrile resins are substantially chemically resistant and hydrophillic in character, and have applications, for example, as filters, diffusers, applicator rolls, aerators, battery separators, and marking pen points.

By way of further illustration of the invention, reference may be made to the following examples. Unless otherwise indicated, all parts and percentages are by weight.

In the following examples various methods were used to identify and evaluate specific characteristics of the sintered articles produced in accordance with the invention.

Specific Gravity—Weigh the sample (in grams) and measure its dimensions (in centimeters). Divide the weight by the sample volume.

Water Absorption—Using the same sample, soak the sample in water for one minute and weigh the wet sample after surface water is knocked off by hand. The percent water absorbed is the weight of water absorbed divided by the original sample weight multiplied by 100.

Flexural Strength—The samples used in the water absorption tests are allowed to dry for three days and used for determining strength. The sample is placed across a span and the load to break the sample is measured by a load cell or scale (similar to the method described in ASTM D790). The flexural strength is calculated using the following equation:

$$\text{Flexural strength} = \frac{3P \times L}{4bh^2}$$

where
P = span
L = load(kg)
b = the beam width
h = the beam thickness

Pressure Drop—A porosity test unit for measuring the pressure drop across a porous disc sample consists of a first tube connected to a water or air supply and a second tube connected to a vacuum pump, the first and second tubes being connected to each other with a ½ inch union. A space for the disc sample is provided in the union. Connected to the second tube between the union and the vacuum pump is a sealed mercury manometer. The union is closed without a sample and the vacuum turned on full flow. The mercury manometer shows a small amount of pressure drop for the empty system (high value). The union is opened and the sample space is plugged. The manometer shows a low value (minimum leakage). The disc sample is gasketed by painting a PVC plastisol on the edge and ⅛" in from edge, placed inside the opened union which is resealed using firm pressure. The vacuum is turned on (pulling air through the disc sample) and the mercury manometer is read. The difference between the reading with the sample in place and the empty system reading is the pressure drop.

EXAMPLES 1 TO 8

In Examples 1 to 8, 2 gm. samples of Barex ® 210 polymer, a rubber-modified nitrile resin based polymer supplied by The Standard Oil Company (Ohio), Cleveland, Ohio, is recovered from its emulsion in powder form and separated using Tyler 120–170 mesh screens. The separated polymer is formed into discs in 1¼ inch diameter molds using a preform pressure of 5,000 PSI at room temperature. In the example where water is added to the polymer (Example 8) the addition is made prior to filling the mold and the amount indicated is percentage by weight based on the weight of the polymer. Conventional or oven heating is accomplished using a forced air oven at 135° C. Dielectric heating is accomplished using a La Rose 8 V, 320 milliamp microwave oven set at 1½ inch height operating at 71.5 MC. Cooling is accomplished in air at room temperature.

| Example | Water | Heat Source | Time | Pressure Drop (mm. Hg) | Specific Gravity | Water Absorption | Break Load Kg | Flexural Strength (Kg/cm$^2$) |
| --- | --- | --- | --- | --- | --- | --- | --- | --- |
| 1 | No | dielectric | 30 sec. | 680 | 0.728 | 44% | 6.5 | 23.3 |
| 2 | No | oven | 15 min | 675 | 0.707 | 48% | 4.3 | 14.1 |
| 3 | No | oven | 22.5 min | 675 | 0.694 | 40% | 5.7 | 17.2 |
| 4 | No | oven | 30 min | 680 | 0.687 | 39% | 8.8 | 26.6 |
| 5 | No | dielectric/oven | 10 sec/7.5 min | 680 | 0.659 | 49% | 3.4 | 10.4 |
| 6 | No | dielectric/oven | 12.5 sec/11.25 min | 680 | 0.702 | 47% | 6.4 | 20.9 |
| 7 | No | dielectric/oven | 15 sec/15 min | 650 | 0.683 | 49% | 7.5 | 22.4 |
| 8 | 5% | dielectric/oven | 12.5 sec/11.25 min | 706 | 0.780 | 27% | 8.2 | 30.4 |

The foregoing examples demonstrate that the properties of the rubber-modified nitrile resin polymer composition sintered using dielectric heat for 30 seconds (Example 1) are comparable or superior to the properties of the same polymer sintered for 15 to 30 minutes (Examples 2 to 4) using a forced air oven under otherwise equivalent conditions. These examples also demonstrate that dielectric heating can be used effectively in combination with conventional heating to sinter preforms of rubber-modified resin compositions. (Examples 5 to 8). These examples demonstrate that the addition of water improves the strength of a product sintered with a method using dielectric heat (Examples 6 and 8). Finally, these examples demonstrate that the preforms of rubber-modified nitrile resin compositions tested herein have sufficiently high loss factors to be effectively heated with dielectric heat.

In the foregoing examples, optimum properties of porosity for various applications such as, for example, certain types of filters wherein relatively porous structures are required, were not achieved under the specific conditions employed due to the fact that the polymer recovered from the emulsion was relatively porous in nature. Consequently, the pressure exerted during the preparation of the preforms compacted the particles to the point that there were insufficient interstices to permit the formation of relatively porous preform structures. Sintered articles with relatively porous structures can be produced if the polymeric powder utilized in the above examples is first melted, for example in an extruder or on a hot mill, then allowed to cool followed by the step of chopping or grinding the cooled melt into cylindrical or cube forms. The melt may be cut as it emerges from the extruder die and then chilled before it fuses; this results in thin cylindrical forms referred to as a "lens" or "fish eye". Lens grade polymers are particularly suited for feeding extruders or molding machines because of their dense nature and free flowing characteristics. However, to be useful in the sintering techniques of the present invention, these grades must be reduced in size to powder form. The resulting powder is significantly more dense and less porous than the powder originally recovered from the emulsion.

EXAMPLE 9

Densified lens grade Barex ® 210 polymer is ground in a Wiley mill and separated using Tyler 70–170 mesh screens. The separated polymer is formed into a disc in a 1¼ inch diameter mold using a preform pressure of 5000 PSI at room temperature. The resulting preform is heated using a combination of dielectric heat for 15 seconds and conventional heat for 15 minutes in the same manner as in the above examples. Cooling is accomplished in air at room temperature. The resulting sintered article exhibited the following characteristics:

| | |
|---|---|
| Pressure drop (mm. Hg.) | 7.9 |
| Specific gravity | 0.48 |
| Water absorption (%) | 80 |
| Break Load (Kg) | 0.6 |
| Flexural Strength (Kg/cm$^2$) | 2.0 |

EXAMPLE 10

Two grams of the Barex ® 210 ground lens polymer of Example 9 are mixed with 0.2 grams water and formed into discs 1¼ inch diameter using a preform pressure of 4000 PSI at room temperature in the same manner as Examples 1–9. The preforms are sintered using dielectric heating for 15 seconds and forced air oven heating at 135° C. for 30 minutes. The resulting sintered article exhibited the following characteristics:

| | |
|---|---|
| Pressure drop (mm. Hg.) | 8.7 |
| Specific Gravity | 0.56 |
| Water Absorption (%) | 68 |
| Break Load (Kg) | 1.95 |
| Flexural Strength (Kg/cm$^2$) | 5.1 |

EXAMPLES 11 AND 12

In the following examples preforms of Barex ® 210 polymer are formed using the indicated preform pressure to form discs having diameters of 1¼ inches and thicknesses of 0.15 inches. The particle size range of the coarse polymeric particles is Tyler 70–170 screen mesh. Ten percent by weight of the preforms are fines, i.e., particles that pass through a No. 240 Tyler mesh sieve. The preforms are heated using dielectric heating for 15 seconds and forced air oven heating at 135° C. for 30 minutes in the same manner as in Examples 1 to 10.

| | Example 11 | Example 12 |
|---|---|---|
| Preform Pressure, PSI | 1000 | 4000 |
| Specific Gravity | .63 | .71 |
| Pressure Drop (mm Hg) | 8.9 | 14.1 |
| Water Absorption | 72% | 68% |
| Strength (Kg) | 3.0 | 4.0 |
| Flexural Strength (Kg/cm$^2$)* | 14 | 23.7 |

*Adjusted for actual dimensions.

These examples demonstrate that the use of a blend of fines with coarse particles provides for improved porosity. They also demonstrate that improved strength can be obtained with higher preform pressures.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for producing a sintered porous polymeric article from a polymeric material with a sufficiently high loss factor for effective dielectric heating comprising:
   forming a preform comprising a plurality of discrete polymeric particles compressed together in a predetermined shape; and
   sintering said preform to form said article, said sintering step including the step of heating said preform using dielectric heating, said sintering step being conducted for a sufficient period to provide said article with desired strength and porosity.

2. The method of claim 1 wherein said sintering step includes the step of heating said preform using conventional heating.

3. The method of claim 2 wherein said conventional heating step precedes said dielectric heating step.

4. The method of claim 2 wherein said dielectric heating step precedes said conventional heating step.

5. The method of claim 1 wherein said preform includes up to 100% by weight coarse particles, said coarse particles being small enough to pass through a No. 16 Tyler mesh sieve.

6. The method of claim 5 wherein said coarse particles are small enough to pass through a No. 70 Tyler mesh sieve.

7. The method of claim 1 wherein said preform includes up to 100% by weight fines, said fines being small enough to pass through a No. 240 Tyler mesh sieve.

8. The method of claim 1 wherein said preform comprises between about 5% to about 25% by weight particle fines.

9. The method of claim 1 wherein said preform comprises up to about 25% by weight of water.

10. The method of claim 9 wherein said preform comprises about 1% to about 10% by weight of water.

11. The method of claim 9 wherein said preform comprises about 5% by weight of water.

12. The method of claim 1 wherein said preform is formed in a mold with a pressure of up to about 10,000 pounds per square inch.

13. The method of claim 12 wherein said preform is formed in a mold with a pressure in the range of about 100 to about 4000 pounds per square inch.

14. The method of claim 1 wherein said dielectric heating step is conducted with microwaves of electromagnetic energy having a frequency in the range of about 890 to about 10,000 MHz.

15. The method of claim 2 wherein said conventional heating is conducted at a temperature in the range of about 120° C. to about 230° C.

16. The method of claim 15 wherein said conventional heating is conducted at a temperature in the range of about 160° C. to about 200° C.

17. The method of claim 1 wherein said dielectric heating step takes about one second to about two minutes.

18. The method of claim 17 wherein said dielectric heating step takes about 5 to about 40 seconds.

19. The method of claim 2 wherein said conventional heating step takes about two minutes to about 60 minutes.

20. The method of claim 19 wherein said conventional heating takes about 15 to about 30 minutes.

21. The method of claim 1 wherein said dielectric heating step is conducted with high-frequency waves of electromagnetic energy having a frequency in the range of about one to about 200 MHz.

22. The method of claim 1 wherein the loss factor of said polymeric material exceeds about 0.08.

23. The method of claim 1 wherein the loss factor of said polymeric material exceeds about 0.2.

24. The method of claims 1 or 2 wherein said polymeric material comprise a rubber-modified nitrile resin.

25. The method of claim 24 wherein said polymeric material comprise a resin resulting from the polymerization of 100 parts by weight of
(a) at least 50% by weight of at least one nitrile having the structure

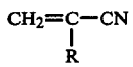

wherein R is hydrogen, a lower alkyl group having from 1 to 4 carbon atoms, or a halogen, and
(b) up to 50% by weight based on the combined weight of (a) and (b) of an ester having the structure

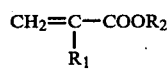

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of
(c) a polymer of about 50% to 100% by weight of a conjugated diene monomer selected from the group consisting of butadiene and isoprene and about 0% to 50% by weight of at least one member selected from the group consisting of styrene, an olefinically unsaturated nitrile having the structure

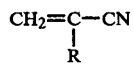

wherein R has the foregoing designation and an ester having the structure

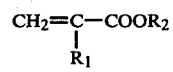

wherein $R_1$ and $R_2$ have the foregoing designations.

26. The method of claim 25 wherein (a) is acrylonitrile.

27. The method of claim 25 wherein (b) is methyl acrylate.

28. The method of claim 25 wherein (c) is a copolymer of butadiene and acrylonitrile.

29. A continuous process for forming sintered porous polymeric articles from a polymeric material with a sufficiently high loss factor for effective dielectric heating comprising:
forming a preform comprising a continuous length of packed discrete polymeric particles of said polymeric material;
sintering said preform in a sintering step comprising the step of heating said preform using dielectric heating; and
comminuting the sintered preform from the previous step to form discrete sintered porous polymeric articles.

30. The method of claim 29 wherein said sintering step includes the step of heating said preform using conventional heating.

31. The method of claim 30 wherein said conventional heating step precedes said dielectric heating step.

32. The method of claim 30 wherein said dielectric heating step precedes said conventional heating step.

33. The method of claim 29 wherein said forming step comprises extruding discrete polymeric particles to form said preform.

34. The method of any of claims 29-33 wherein said polymeric material is a rubber-modified nitrile resin.

35. The method of any of claims 29-33 wherein said polymeric material comprises a resin resulting from the polymerization of 100 parts by weight of
(a) at least 50% by weight of at least one nitrile having the structure

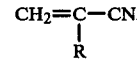

wherein R is hydrogen, a lower alkyl group having from 1 to 4 carbon atoms, or a halogen, and
(b) up to 50% by weight based on the combined weight of (a) and (b) of an ester having the structure

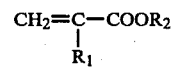

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of
(c) a polymer of about 50% to 100% by weight of a conjugated diene monomer selected from the group consisting of butadiene and isoprene and about 0% to 50% by weight of at least one member selected from the group consisting of sytrene, an olefinically unsaturated nitrile having the structure

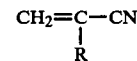

wherein R has the foregoing designation and an ester having the structure

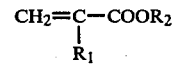

wherein $R_1$ and $R_2$ have the foregoing designations.

36. The method of claim 35 wherein (a) is acrylonitrile.

37. The method of claim 35 wherein (b) is methyl acrylate.

38. The method of claim 35 wherein (c) is a copolymer of butadiene and acrylonitrile.

* * * * *